United States Patent [19]

Hillmann et al.

[11] Patent Number: 4,700,023
[45] Date of Patent: Oct. 13, 1987

[54] TRACKLESS, CENTER ARTICULATION UNDERGROUND VEHICLE DRIVEN BY AN ELECTRIC MOTOR

[75] Inventors: Willi Hillmann, Kamen; Hermann Paus, Emsbüren; Eberhard Drews, Lennestadt, all of Fed. Rep. of Germany

[73] Assignees: Metallgesellschaft AG; Maschinenfabrik Hermann Paus GmbH; Paul Vahle GmbH & Co. KG, all of Frankfurt, Fed. Rep. of Germany

[21] Appl. No.: 823,659

[22] Filed: Jan. 29, 1986

[30] Foreign Application Priority Data

Jan. 31, 1985 [DE] Fed. Rep. of Germany ....... 3503225

[51] Int. Cl.$^4$ ............................................ H02G 11/02
[52] U.S. Cl. ............................ 191/12.2 A; 191/12 R; 242/86.51
[58] Field of Search ........... 191/12 R, 12.2 R, 12.2 A, 191/23 A, 48; 242/54 R, 86.51

[56] References Cited

U.S. PATENT DOCUMENTS

| | | | |
|---|---|---|---|
| 2,264,007 | 11/1941 | Russell | 191/12.2 A |
| 2,625,344 | 1/1953 | Flansburgh | 191/12.2 A X |
| 2,781,456 | 2/1957 | Buckeridge | 191/12.2 A X |
| 2,903,526 | 9/1959 | Mattox, Sr. | 191/12.2 A X |
| 3,632,906 | 1/1972 | Aihara | 191/12.2 A |
| 3,695,377 | 10/1972 | Ito et al. | 191/12 R |
| 4,350,850 | 9/1982 | Kovacik et al. | 191/12.2 R |
| 4,511,100 | 4/1985 | Oetringhaus | 242/86.51 |
| 4,569,489 | 2/1986 | Frey et al. | 242/86.51 |

FOREIGN PATENT DOCUMENTS

| | | |
|---|---|---|
| 0088868 | 1/1983 | European Pat. Off. . |
| 2517836 | 6/1975 | Fed. Rep. of Germany . |
| 2508883 | 7/1982 | France . |
| 772906 | 10/1980 | U.S.S.R. ......................... 191/12.2 R |
| 785178 | 12/1980 | U.S.S.R. ......................... 191/12.2 R |

OTHER PUBLICATIONS

CIM Reporter, E. N. DuRussel et al., Development of Electrical Equipment at the Fox Mine,–Presented at the CIM Underground Operators Conference, Sudbury, Ontario, Feb. 1981; (5 pages), published May 4, 1981.

Primary Examiner—Robert B. Reeves
Assistant Examiner—John G. Pido
Attorney, Agent, or Firm—Karl F. Ross; Herbert Dubno

[57] ABSTRACT

A trackless, center-pivot underground vehicle is described, which has a tractor section, which is driven by an electric motor, which is powered via a sliding contact line, a current collector device, which is movable along the contact line line, and a supply cable, which is electrically and mechanically connected to the current collector device and adapted to be unwound from a reel against a restoring force. An improved mobility of the vehicle and a large width range throughout the range of travel are ensured by the combination of the following features:

a. the supply cable is connected to the current collector device by a slip ring member, which is rotatable about a vertical axle;
b. a helically winding cable reel is mounted on the tractor section and rotatable about a vertical axle, which is provided with a slip ring member;
c. a guide arm is coaxially arranged with respect to the cable reel and adapted to be pivotally movable by hydraulic means; and
d. a hydrostatic axial piston transmission is coupled to a three-phase a.c. motor.

8 Claims, 4 Drawing Figures

TRACKLESS, CENTER ARTICULATION UNDERGROUND VEHICLE DRIVEN BY AN ELECTRIC MOTOR

FIELD OF THE INVENTION

Our present invention relates to a trackless, center articulation underground vehicle having a tractor section, which is driven by an electric motor powered via a sliding contact line, a current collector device which is movable along the line, and a supply cable which is electrically and mechanically connected to the current collector device and adapted to be unwound from a reel against a restoring force.

BACKGROUND OF THE INVENTION

The bulk material recovered in ore or salt mines can be hauled from the working spaces to the surface by self-propelled trackless vehicles, usually center pivot dumpers.

Such vehicles can be driven by diesel engines although the use of diesel engines for driving the hauling vehicles results in considerable pollution of the underground air.

For this reason it is known to use railbound underground vehicles, which are supplied with electric power via a contact wire extending along the bed or from replaceable batteries.

"CIM Reporter", Vol. 7, No. 2, of May 4, 1981, discloses a center-pivot-steered underground vehicle which is provided with an electric motor and powered from a supply system consisting of a sliding contact line, a current collector and a cable reel. The cable is self-tensioning the vehicle can move along and transversely to the sliding contact line. The cable reel is a random-winding reel, which is rotatably mounted on a horizontal axis and is disposed in front of the vehicle.

German Patent Publication DE-AS No. 25 17 836 discloses means for transmitting electric power by means of a cable from a stationary installation to a vehicle, which may be trackless and is provided with a cable reel unit having a vertical axis on which two concentric drums are rotatably mounted one over the other.

In one embodiment the reel unit is connected to a movable current collector, which moves along a conductor rail system. The power supply cable, e.g. a ribbon cable, and a rope are wound in mutually opposite senses on respective reels.

During transverse movements of the vehicle under the rail system the two drums rotating in mutually opposite senses are intended to prevent an undesired twisting of and interference between the cable and the rope.

That known vehicle has several disadvantages and does not meet the requirement that it should be virtually freely movable and rotatable in any position under the contact wire system through an angular range from 0 to 360 degrees. Because the supply cable itself cannot be rotated as desired, mechanical tensile stresses, ruptures and disruptive electric discharges can easily occur. In most cases the supply cable sags and it may be damaged as it is dragged on the floor or chafes on the vehicle.

Other known vehicles of the kind described hereinbefore have disadvantages which include a small range of travel, an excessive unladen weight of vehicles powered by a battery or from a contact wire, susceptibility of rectifier installations to shock and a susceptibility of d.c. drives provided with a collector to moisture and aggressive gases and liquids.

OBJECT OF THE INVENTION

It is an object of the present invention to provide a vehicle for the purposes described which can operate along any desired path within the range of travel of the system without an undesired twisting of the flexible supply cable and without a need for a steering of the vehicle along a cyclic course by the driver.

Another object of our invention is to provide a vehicle and power supply system which obviates drawbacks of the earlier systems mentioned above.

SUMMARY OF THE INVENTION

These objects and others which will become apparent hereinafter are achieved with a trackless, center-pivot underground vehicle having a tractor section which is driven by an electric motor, which is powered via a sliding contact line, a current collector device, which is movable along said line, and a supply cable, which is electrically and mechanically connected to said current collector device and adapted to be withdrawn from a reel against a restoring force.

According to the invention, this vehicle embodies the following features in combination:

a. the supply cable is connected to the current collector device by a slip ring member, which is rotatable about a vertical axis;

b. a spirally winding cable reel is mounted on the tractor section and rotatable about a vertical axis, which is provided with a slip ring member;

c. a guide arm is coaxially arranged with respect to the cable reel and adapted to be pivotally movable by hydraulic means; and d. a hydrostatic axial piston transmission is coupled to a three-phase a.c motor.

By means of the invention it is ensured that the hauling vehicle will continuously be powered from the power supply system (conductor rail system) during travel in the longitudinal direction, e.g. along the haulage road, and during transverse travel in a space, e.g. the free space, at the forward end of the haulage road so that the trackless hauling vehicle is free to move to the desired extent and any twisting of the supply cable The underground vehicle in accordance with the invention can be provided at the current collector device with a disconnector for the detachable electric supply cable. As a result, the vehicle can be electrically disconnected from the stationary electric power supply system, e.g. when the vehicle is to be replaced or in case of danger or of accidents.

An additional disconnector or even the same disconnector in part provided on the tractor section can be used for an electric connection between a mobile electric power source and the underground electric vehicle. A mechanical coupling is additionally effected. In that case a generator may be mounted on a separate vehicle, such as a trailer, and may be used to power the underground electric vehicle when it travels on the surface. The supply cable of the electric vehicle is suitably connected to the generator by means of a socket outlet. When the mobile generator is not required, it can be parked on the surface and in case of need it can quickly be moved to the desired underground vehicle (electric loader, electric dumper).

The underground vehicle in accordance with the invention is an all-wheel-driven, center-pivot vehicle having a cradle frame. The vehicle is generally driven by an electric motor having a power of, e.g. 200 kW at 1500 r.p.m. and a voltage of 950 volts.

For the travel drive, the motor is succeeded by a power divider and a plurality of hydrostatic axial-piston transmissions for powering the hydrostatic drive motors individual to each of the four wheels. The working and steering hydraulic systems and the hydraulic means for driving the cable reel and the guide arm are also powered from the electric motor via hydrostatic axial-piston transmissions.

As the underground vehicle in accordance with the invention moves away from the sliding contact line, the supply cable will be unwound from the cable reel, which rotates about a vertical axle and on which the cable is helically wound and in that case a contact of the supply cable with the floor will be avoided. As the vehicle moves back toward the sliding contact line, the connecting cable is automatically wound up.

The tension of the supply line can be varied in dependence on the length of the unwound cable in such a manner that the supply cable will be clear of the floor between the current collector car and the vehicle. This can be accomplished, e.g. by a continuous change of the torque of the cable reel, e.g. by a control of the pressure applied to the rotary hydraulic motor for driving the cable reel in dependence on the length of the unwound cable.

For a longitudinal travel of the vehicle along the sliding contact line the tension of the supply cable wound on the cable reel is so adjusted that the supply cable will move the current collector car along the sliding contact line during the travel of the vehicle.

The cable reel which is rotable about a vertical axis is suitably disposed directly above the tractor section of the vehicle. Such an arrangement permits the vehicle to have a small overall height and can be accommodated within the height of the haulage road.

The electric connection of the connecting cable to the sliding contact line, i.e. the current collectors associated with the conductor rails of the sliding contact line, is suitably established by means of a slip ring member, which is suspended from the current collector car and rotatable about a vertical axis. That slip ring member ensures that the transport vehicle will be freely movable and that the supply cable will not be twisted. The guide arm required for a controlled unwinding and winding of the supply cable from and on the cable reel is coaxial to the cable reel and is suitably moved by hydraulic drive means in the winding sense. The means for driving the cable reel and the guide arm act in mutually opposite senses of rotation so that the supply cable will be held under the required tension in dependence on the speed of travel of the vehicle and that tension will be adapted to the weight of the cable which has been unwound.

In order to prevent a complete unwinding of the supply cable from the reel whereby the risk of a rupture of the cable would be increased, another embodiment of the invention comprises an electric limit switch, which is mounted on the cable reel adjacent to the inner region of the coiled cable. A location is selected for the switch such that as the cable is unwound a preselected length of the cable will remain on the reel and will be available for a compensation of movement whereas the vehicle is automatically de-energized and arrested by the limit switch.

In dependence on the diameter and material of the supply cable, the latter has a certain stiffness, which may give rise to trouble when the vehicle moves very close to the sliding contact line or to the slip ring member. To permit a substantial compensation of the stiffness of the cable, the free length of the cable between the guide arm and the slip ring member must not be too small. In a further embodiment of the invention, at least wo electric limit switches are mounted in combination on the cable reel adjacent to the outer region of the coiled cable and the locations of said switches are so selected that the vehicle will be automatically de-energized and arrested before the cable length between the guide arm and the slip ring member is reduced below the shortest permissible length as the cable is wound on the reel and particularly toward the end of that winding operation.

The cable reel provided in accordance with the invention is also provided with a coupling element, by which the guide arm can be locked to the cable reel so that both elements can jointly be moved and adjusted.

Electric power is supplied to the underground vehicle in accordance with the invention from the sliding contact line via the current collector car and the cable reel mounted on the vehicle to the power inlet of the vehicle. Circuitry for the following functions, for instance, is installed for reasons of safety. The travel motor cannot be switched on unless a direction-of-travel lever is in a neutral position and the auxiliary drives are energized. In response to a stop of the vehicle, the parking brake of the vehicle and the brake for the cable reel are automatically applied. That feature is necessary to ensure that the vehicle will be stopped immediately in case of a power failure or of an emergency cutoff because the electric motor has no braking function. When the cable has been unwound from the cable reel as far as to an adjustable limit, a visual signal which cannot be overlooked will be given to the driver by a flashing light. When the driver then continues to travel away from the sliding contact line, the travel motor will be deenergized and the brake will be applied in time.

The vehicle is also provided with means for automatically monitoring the insulation resistance of the feed line and security of the conductors of the feed line against fracture so that risks can be avoided in time.

Means for monitoring the insulation are known and are conventionally employed also in mining in low-voltage power supply systems having an open star point. Such means measure the insulation resistance between the ground potential and each conductor of the power supply system. Means for monitoring the security against fracture of a monitoring conductor incorporated in supply cables are also known.

BRIEF DESCRIPTION OF THE DRAWING

The above and other objects, features and advantages of the present invention will become more readily apparent from the following description, references being made to the accompanying highly diagrammatic drawing in which.

SPECIFIC DESCRIPTION

Figure 1:
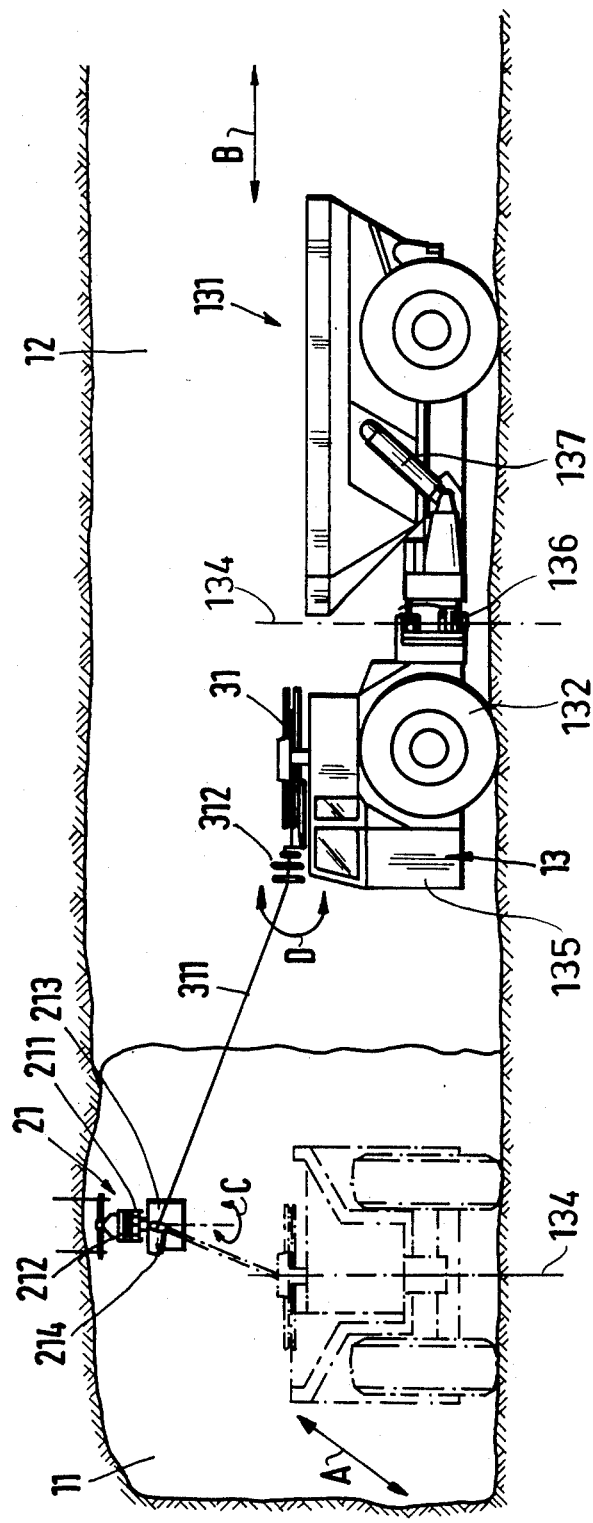
FIG. 1 is a side elevation of a vehicle according to the invention in a subterranean gallery.
Figure 2:
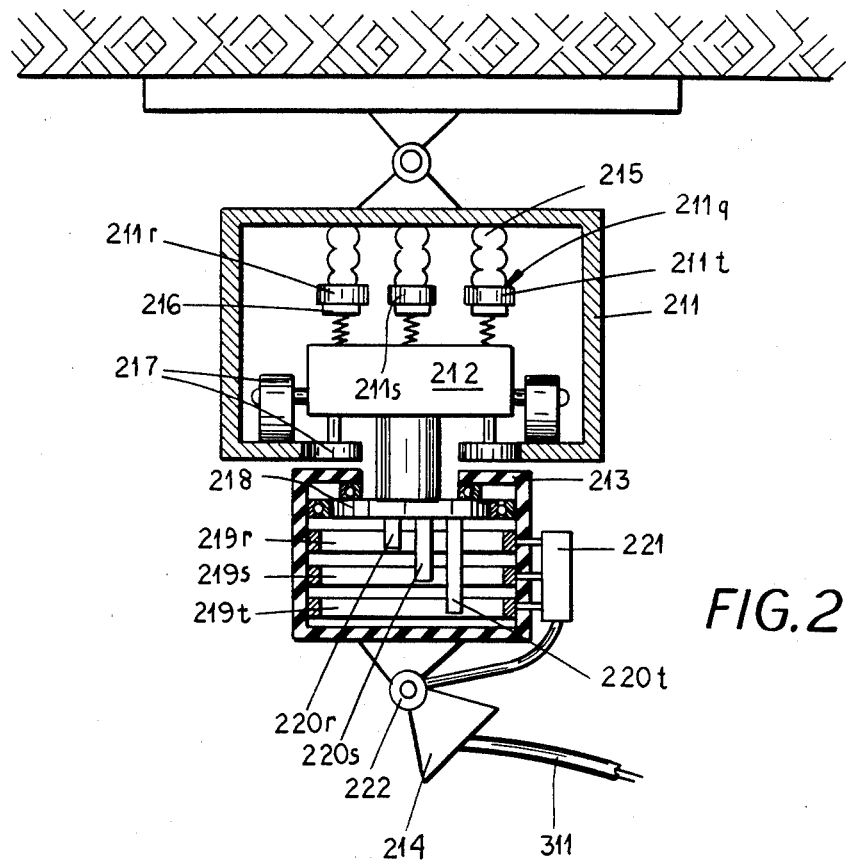
FIG. 2 is a transverse section through the current collector.
Figure 3:
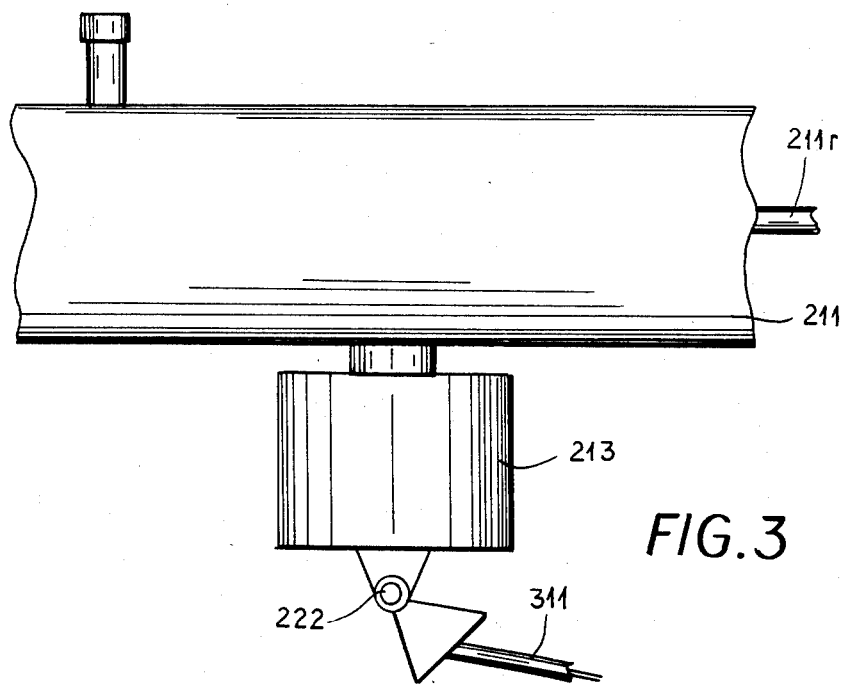
FIG. 3 is a side view of the current collector.

The drawing shows an underground vehicle on the haulage road 11, which extends into the depth of the drawing from the working space 12, which is disposed at the end of the haulage road 11 and protrudes laterally from the cross-section of the haulage road 11.

The material which has been recovered in the working space 12 is hauled along the haulage road 11 by means of the trackless underground vehicle 13, which is a self-propelled dumper.

For this reason the vehicle 13 must be able to travel transversely in the working space 12 in the direction indicated by the double-headed arrow B and longitudinally along the haulage road 11 in the directions indicated by the double-headed arrow A.

Figure 4:
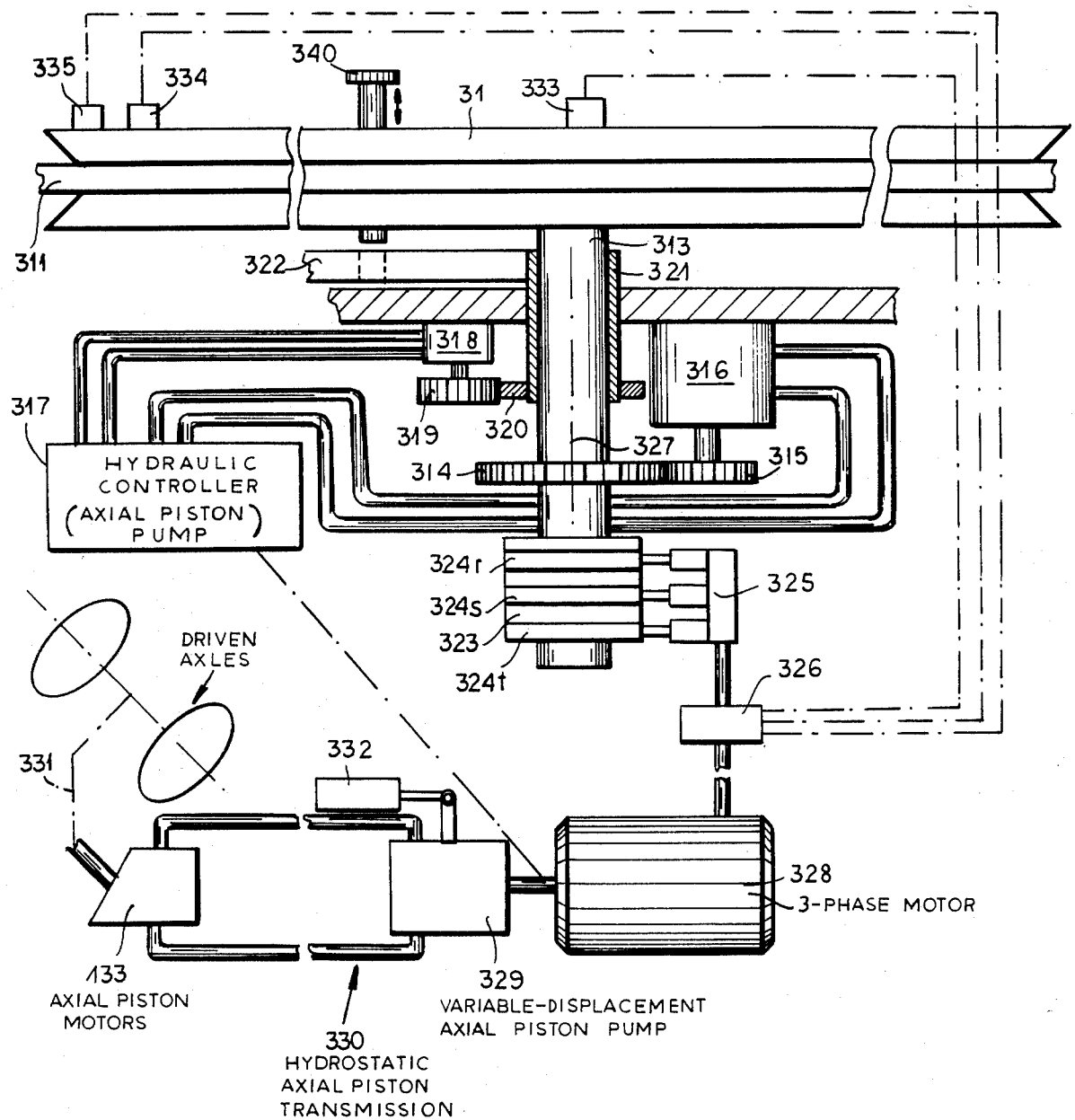
FIG. 4 is a diagram illustrating principles of the invention.

The two axles 132 of the vehicle are driven by individual hydraulic motors 133 (FIG.4), the front wheels being steerable about the vertical axis 134 by means now shown. The tractor 135 is linked to the trailer 131 formed with the hauling bucket by a center articulation 136 and a hydraulic arrangement 137 is provided to allow dumping of the bucket.

For a supply of electric power to the underground vehicle 13 driven by an electric motor a suspended sliding contact line 21 is provided, which extends throughout the length of the haulage road 11 and has associated with it a track 211, on which a current collector device or current collector car 212 is movable. The current collectors of that device or car are in electric contact with the conductor rails of the sliding contact line. The current collector car 212 is connected to a slip ring member 213, which is connected to a tension-resisting line 311, which leads to the vehicle 13 and consists of a supply cable that can be unwound from the cable reel 31 mounted on the vehicle 13.

The track 211 has an array 211g of rails 211r, 211s, 211t supported on insulators 215 and which are engaged by spring loaded shoes 216 of the carriage 212 which rides on rollers 217 upon and against the track. The carriage 212 has a disk 218 upon which the slip-ring drum 213 is rotatable. This drum has slip rings 219r, 219s, 219t engaged by wipers 220r, 220s, 220t connected to the respective shoes 216 engaging the rails 211r, 211s, 211t. A disconnect block 221 which can be removed together with funnel guide 214 and the associated portion of pivot 222, connects the cable 311 to the conductors of the slip rings.

The cable reel 31 is subjected to an adjustable restoring force, which during a longitudinal travel of the vehicle 13 in the directions indicated by the double-headed arrow A is so controlled that the traveling vehicle 13 will pull the current collector car 212 along. During a transverse travel in directions indicated by the double-headed arrow B, that force is variable so that the cable 311 can be unwound from the cable reel 31 as the vehicle 13 moves away from the sliding contact line system and that the unwound cable 311 will not sag.

The cable reel 31 is mounted on the vertical shaft 313 (FIG. 4) and carries a gear 314 meshing with a gear 315 of a hydraulic motor 316 (preferably forming part of an axial piston transmission) driven via the controller 317 which also controls the hydraulic motor 318 whose gear 319 meshes with a gear 320 of a sleeve 321 carrying a support 322 for a guide arm 312 (FIG. 1).

The shaft also carries a slip-ring body 323 having the slip rings 324r, 324s, 324t which are connected to the conductors of cable 311. Wipers 325 connect the slip rings 324r, 324s, 324t to the motor through the motor-control relay 326.

The slip ring member 213 associated with the current collector car 212 ensures that the end of the line 311 will be oriented in the direction of tension (double-headed arrow C) during a travel of the vehicle 13 along the haulage road 11 in both directions indicated by the double-headed arrow A, i.e., during a travel toward and away from the working space. The slip ring member 213 also permits an orientation in dependence on the direction of travel of the vehicle 13 as it turns from the haulage road 11 into the working space 12 and during a transverse travel of the vehicle in the working space 12 in the directions indicated by the double-headed arrow B.

The cable is guided by the funnel 214, which precedes the slip ring member 213, and by a guide arm 312, which is coaxial to the cable reel 31 and is suitably pivotally movable relative to the cable reel 31 in a horizontal plane (double-headed arrow D) about the axis 327 of the reel and arm.

The power is delivered by the motor controller 326 to a three-phase motor 328 which drives the variable-displacement axial-piston pump 329 of an axial piston hydrostatic transmission 330 driving the axial piston motors 133 of which only one has been shown. The motors 133 are coupled to the wheels 132 (FIG. 4) as shown at 331. The transmission control is shown at 332. A limit switch 333 is located on the cable reel 31 adjacent to the inner region of the coiled cable to deenergize the motor through the control 326 when a predetermined minimum length of cable is still on the drum or reel 31.

Two electric limit switches 334,335 are so mounted on the outer region of the reel that the vehicle will be deenergized and stopped via the controller 326 when the cable between the guide arm 312 and the slip-ring drum 213 has the shortest permissible length. A locking pin 340 can be pressed down to lock the guide arm 312 to the reel 31.

The advantages afforded by the underground vehicle in accordance with the invention are seen in that such vehicle can travel virtually unlimited distances and has a large width range even in roads in which the clearance space above the vehicle is very small. The vehicle can also travel freely throughout its range of action without a twisting of the electric supply cable or other trouble with that cable.

The controller 317 drives the motors 316,318 so that the arm and reel are driven in opposite senses in dependence upon the length of unwound cable and hence the cable is held under the required tension with respect to the speed of travel.

We claim:
1. In a trackless, center-pivot underground vehicle having a tractor section which is driven by an electric motor powered via a sliding contact line, a current collector device movable along said line, and a supply cable electrically and mechanically connected to said current collector device, the improvement which comprises in combination:

a first slip ring member rotatable about a vertical axis connecting said supply cable to the current collector device;

a helically winding cable reel mounted on the tractor section and rotatable about a vertical axis and provided with a second slip ring member;

a guide arm coaxially arranged with respect to the cable reel and adapted to be pivotally movable by hydraulic means; and a hydrostatic axial piston transmission is coupled to a motor for driving said vehicle, said motor being a three-phase a.c. motor.

2. The improvement defined in claim 1, further comprising a disconnector provided on said first slip ring member.

3. The improvement defined in claim 2 wherein said guide arm and hydraulic means are constructed and arranged for exerting an adjustable tension on the cable.

4. The improvement defined in claim 1 wherein said guide arm and hydraulic means are constructed and arranged for exerting an adjustable tension on the cable.

5. The improvement defined in claim 1, further comprising said hydraulic drive means for rotating the cable reel and the guide arm in mutually opposite senses.

6. The improvement defined in claim 1, further comprising an electric limit switch mounted on the cable reel adjacent to the inner region of the coiled cable and so located that the vehicle will be deenergized when a predetermined length of the cable is still on the drum.

7. The improvement defined in claim 1, further comprising at least two electric limit switches mounted in combination on the cable reel adjacent to the outer region of the coiled cable and are so located that the vehicle will be deenergized when the cable between the guide arm and the slip ring member has the shortest permissible length.

8. The improvement defined in claim 1, further comprising a coupling element for locking the guide arm to the cable reel.

* * * * *